April 22, 1969   H. W. WILKINS   3,439,581
SLIDE UNIT
Filed Aug. 15, 1966   Sheet _1_ of 4
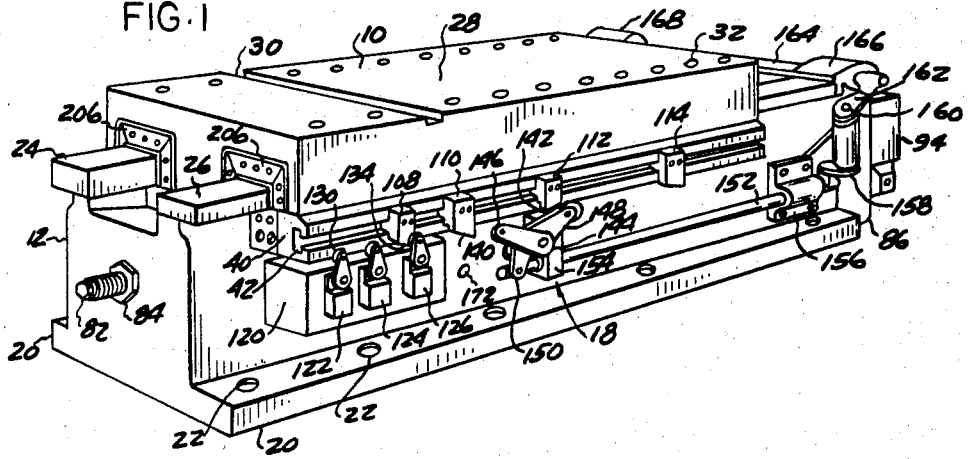
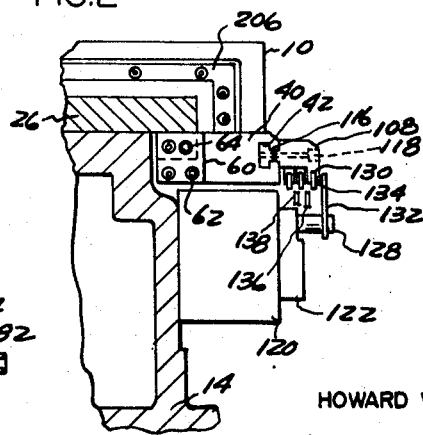
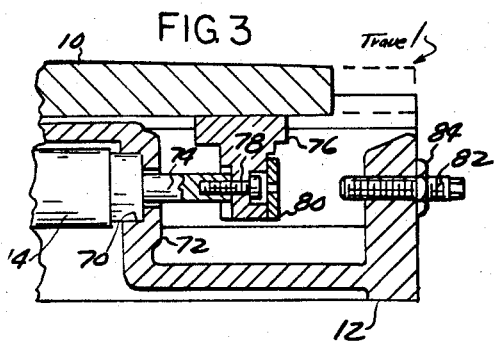
INVENTOR
HOWARD W. WILKINS
BY *Hauke, Kram, & Gifford*
ATTORNEYS

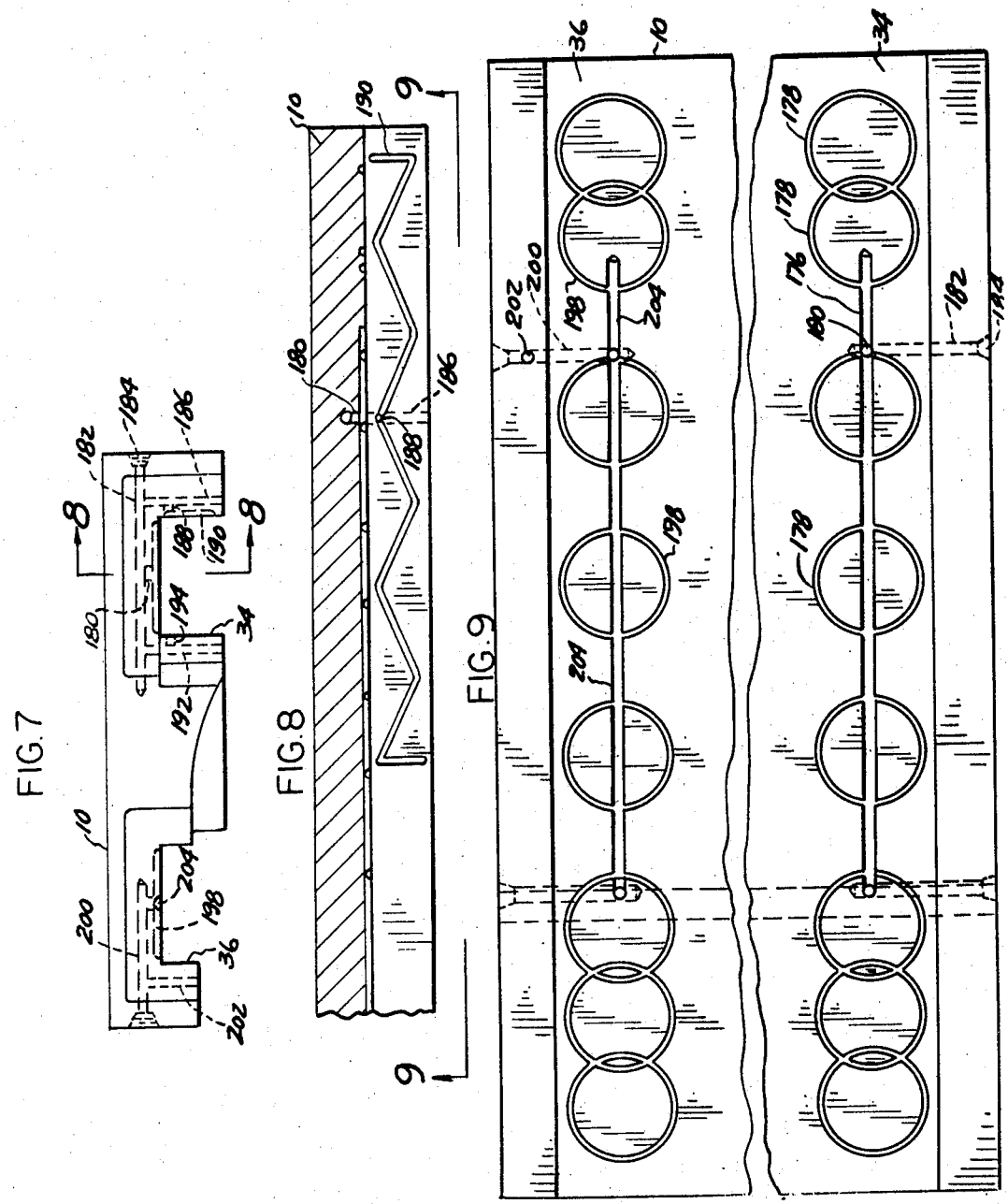

United States Patent Office 3,439,581
Patented Apr. 22, 1969

3,439,581
SLIDE UNIT
Howard W. Wilkins, Warren, Mich., assignor to Research Designing Services, Inc., Warren, Mich., a corporation of Michigan
Filed Aug. 15, 1966, Ser. No. 572,310
Int. Cl. F01b 23/00, 29/08
U.S. Cl. 91—55                            12 Claims

ABSTRACT OF THE DISCLOSURE

A slide mechanism for carrying a tool toward and away from a workpiece includes a platen mounted for reciprocal movement on a frame. A hydraulic cylinder controlled by a sensing apparatus automatically reciprocates the platen on the frame and a cylinder, control mechanism, and sensing apparatus are removable as a package from the frame for repair or replacement. Wedge shaped gibs are provided along the guideway of the frame so that wear can be compensated for by longitudinal adjustment of the gibs.

---

This invention relates to slide mechanisms and more particularly to a powered slide apparatus having a moving member adapted to carry a tool which is reciprocated toward and away at a selectively variable rate of travel from a position wherein the tool engages a workpiece.

This invention relates to slide units and more particularly to slide units of the type powered by a hydraulic means and which are useful either individually or in combination in carrying tools such as boring heads, drilling heads, deburring heads and the like. Normally slide units of this type are used singly or arranged in sequence in an automated manufacturing process. The conventional slide unit comprises a base having a guideway, a work holding platen having a channel and which is slidably mounted on the guideway to move in reciprocal movement relative to the base, a hydraulic cylinder arranged to reciprocate the platen, a hydraulic control unit including a source of hydraulic power connected to the cylinder and adapted to power the cylinder so that the cylinder rod extends and retracts at a controlled rate, and a sensing apparatus responsive to actuation by dogs carried by the platen to transmit a signal to the control unit to control the volume of hydraulic fluid delivered by the control device to the cylinder.

Heretofore conventional slide units have been provided with the hydraulic cylinder normally disposed in the frame and longitudinally removable from one end thereof and the hydraulic control unit mounted on a side of the frame in such a position that the control lever is actuated by the dogs carried by the platen as it reciprocates back and forth. When malfunction occurs, either in the hydraulic control unit or the hydraulic cylinder, repairs normally must be made on the slide unit in place, or if the unit is irreparable then either the control unit or the cylinder must be removed and replaced as the case requires. In the conventional slide unit, the time to repair the malfunctioning component often results in costly down time in the manufacturing line associated with the unit.

The preferred embodiment of the present invention, which will be subsequently described in detail, has as its major feature the capability that the entire power assembly may be quickly and readily removed from the slide unit. This has been achieved by combining the cylinder, and the hydraulic control apparatus in a single unit which may be removed longitudinally from the unit in a matter of minutes by removing a few threaded fasteners. In the event of malfunction, a replacement unit can be quickly installed in the slide unit thus permitting the associated assembly line to quickly resume its normal production. The hydraulic control unit is controlled preferably by a mechanical linkage which employs a pivot lever mounted on the side of the frame and which moves in response to engagement with the dogs carried by the platen.

The platen is supported for sliding movement on a pair of guideways including a main guideway and an auxiliary guideway. Both of the guideways support the platen for a load imposed on the platen normal to the plane of the guideways. For this reason it is necessary, because of the substantial loads imposed on the guideways, to provide a lubrication system for delivering a lubricant between the platen channel and the guideways. Conventionally a fluid lubricant is delivered through flexible conduits to a port provided in the platen where it is delivered to the guideways through a suitable passage. A problem associated with this conventional means of supplying a lubricant through a flexible conduit to the moving member is that the conduits have a tendency to fatigue, or fray and present a potential problem of parting from the moving member thereby causing a loss of lubricating fluid to the operating slide unit.

Another major feature of the present invention obviates the aforementioned lubrication problem and takes the form of a novel lubrication system wherein the fluid lubricant is supplied through a passage in the stationary frame and delivered to the upper bearing surface of the guideway where it registers in an elongated groove provided in the bearing surface of the platen for delivery through passages provided in the platen to the side bearing surfaces between the guideways and the platen.

The preferred embodiment of the present invention further employs a unique combination of gibs for absorbing transverse loads imposed on the platen, and which provide wear surfaces between the platen channels and the guideways. In addition the disposition of the gibs is such as to permit a small degree of lateral adjustment between the platen and the frame. Normally, in the conventional slide units, gibs are provided for providing a wear surface between either the vertical bearing surfaces or the horizontal bearing surfaces between the platen channel and the guideways. The preferred embodiment of the present invention however employs gibs to provide wear and bearing surfaces between both the vertical and horizontal faces of the guideways.

It is therefore a primary object of the present invention to reduce the time in replacing or repairing hydraulically powered slide units by providing such a unit having a power cylinder and its associated control apparatus combined in a single unit which may be quickly and easily separated from the frame of the slide unit.

It is another object of the present invention to improve hydraulic slide units having a hydraulic control apparatus for supplying a variable quantity of fluid to a hydraulic cylinder by providing a sensing device mounted on the side of the frame remote from the hydraulic control apparatus and which in response to a selected movement of the platen transmits a mechanical signal to the control apparatus for regulating the quantity of fluid delivered to the power cylinder.

It is still another object of the present invention to improve the operation of slide mechanisms by providing a lubrication system for delivering a fluid lubricant to the bearing surfaces between the moving member and the stationary member wherein the lubricant is delivered through a passage in the stationary member to the bearing surfaces between the stationary member and the moving member.

Still another object of the present invention is to improve slide mechanisms by providing longitudinally adjustable tapered gibs at the sliding bearing surfaces between the moving member and the stationary member and which provide wear surfaces and in addition means for laterally adjusting the moving member relative to the stationary member.

Still further objects and advantages of the present invention will readily occur to one skilled in the art to which the invention pertains upon reference to the following detailed description. The description makes reference to the accompanying drawings in which like reference characters refer to like parts throughout the several views and in which:

FIG. 1 is a perspective view of a slide unit illustrating a preferred embodiment of the present invention;

FIG. 2 is a perspective elevational view of the slide unit illustrated in FIG. 1 taken from the end opposite to that shown in FIG. 1 and with the power unit separated from the frame of the slide unit;

FIG. 3 is a fragmentary elevational view of the slide unit illustrated in FIG. 1 and showing the power cylinder rod connected to the platen for reciprocal movement;

FIG. 7 is an endwise view of the platen illustrated in FIG. 1;

FIG. 8 is a sectional view taken along lines 8—8 of FIG. 7 and which illustrates the preferred lubrication grooves;

FIG. 9 is a view taken along lines 9—9 of FIG. 8 and illustrating the horizontal lubrication grooves provided in the platen channels; and FIG. 10 is a fragmentary sectional view illustrating one of the platen carried dogs moving into operative engagement with one of the switches.

Figure 5:
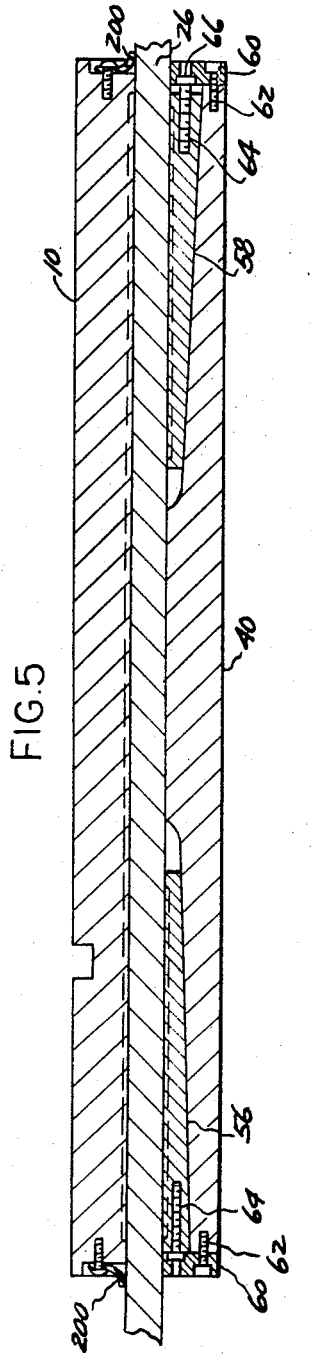
FIG. 5 is a longitudinal sectional view of the platen illustrated in FIG. 1 and showing the adjustable gibs for compensating for wear of the bearing surfaces.

Now referring to the drawings, FIGS. 1 and 2 illustrate a preferred slide unit as comprising a platen 10 mounted for reciprocal movement on a frame generally indicated at 12. A hydraulic cylinder 14 under the control of a control apparatus 16 powers the platen for reciprocal movement. A sensing apparatus 18 mounted on the side of the frame 12 actuated by movement of the platen 10 transmits a signal by a mechanical linkage to the control apparatus 16 to selectively vary the amounts of fluid delivered to the cylinder 14.

A longitudinal flange 20 is provided along the lower opposite side edges of the frame 12 and has a plurality of bores 22 adapted to permit the frame 12 to be mounted to a machine base. It is to be understood that the frame 12 may be mounted to a horizontal base or to a base inclined at any angle.

The frame 12 also carries a longitudinally main guideway 24 and an auxiliary guideway 26 which are spaced apart and parallel to one another and preferably have coplanar upper surfaces. The main guideway 24 and the auxiliary guideway 26 run the full length of the frame 12 and have outboard overhanging side edges.

The platen 10 has a length less than the length of the guideways 24 and 26 and a width sufficient to provide an upper machined surface 28 to accommodate a machine tool (not shown). A transverse key slot 30 and a plurality of holes 32 are provided in the surface 28 to fasten the machine tool to the surface 28 and which is to be carried in reciprocating movement by the platen 10.

Now referring to FIGS. 1 and 7, the platen 10 is provided with a longitudinal channel 34 and a longitudinal channel 36 which are associated with the guideways 24 and 26 respectively. The platen 10 further carries an elongated keeper member 38 which is associated with the channel 34 and as can best be seen in FIG. 2 extends inwardly of the channel and under the overhanging outboard edge of the guideway 24. The keeper 38 is fixed to the platen 10 preferably by a plurality of bolts (not shown).

The platen 10 is also provided with a keeper 40 which is associated with the channel 36 and which extends under the overhanging side edge of the machine way 26 as can be seen in FIG. 1. The keeper 40 is secured to the outboard under side of the channel 36 by a plurality of bolts (not shown). The keepers 38 and 40 preferably have a length coextensive with the channels 34 and 36. A T slot 42 is provided on the outboard side of the keeper 40 as can best be seen in FIG. 1 and FIG. 10. The T slot 42 runs the full length of the keeper 40 and is preferably open ended as shown.

Figure 6:
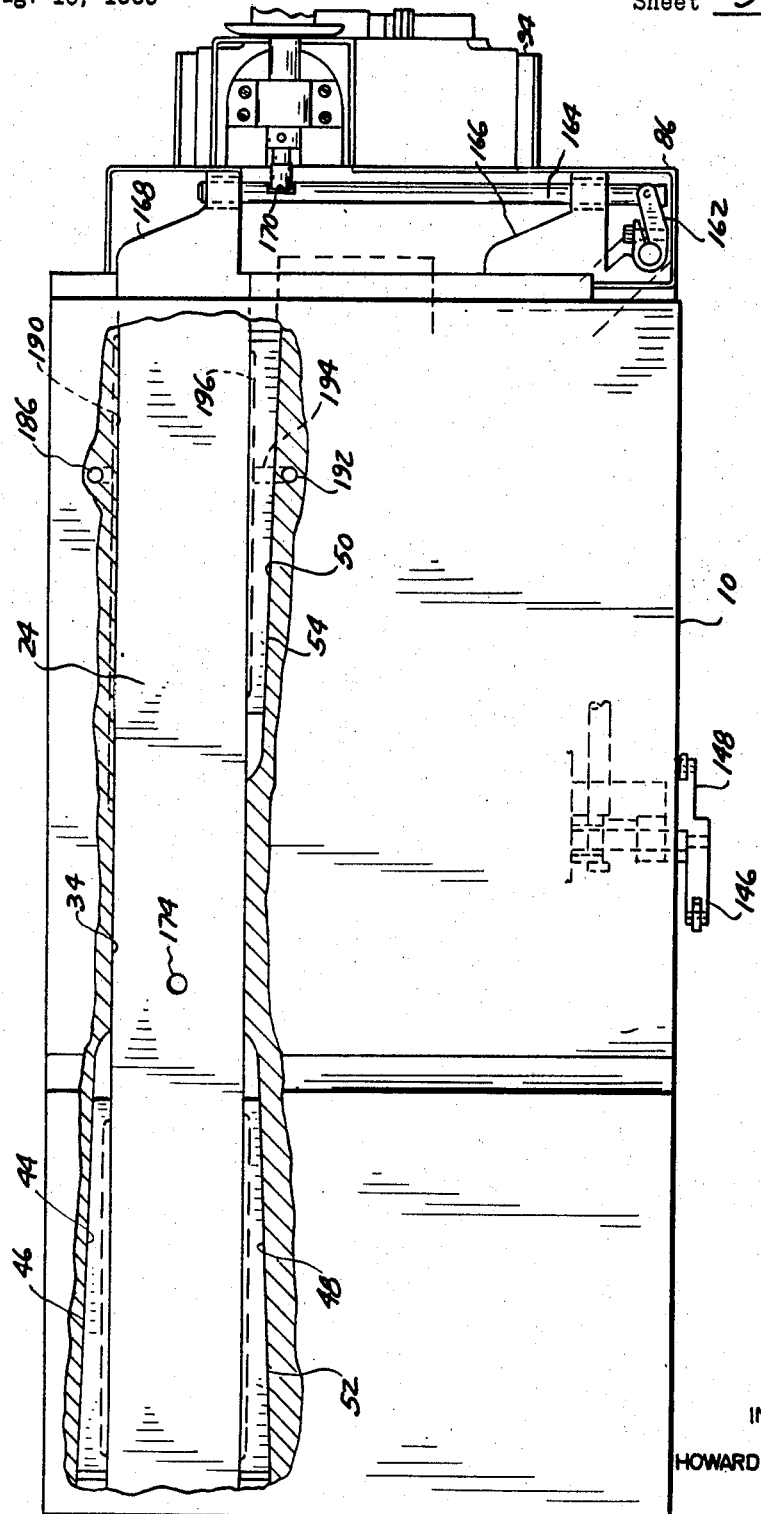
FIG. 6 is a plan view of the preferred slide unit with parts in section to illustrate the wear gibs in position for absorbing lateral forms imposed on the platen, and with parts broken away for purposes of clarity.

Loads imposed on the platen 10 in a direction normal to the guideways 24 and 26 are absorbed by the upper surfaces of each of the guideways. Loads imposed in a lateral direction on the platen 10 are absorbed through the side surfaces of the main guideway 24. Referring to FIG. 6, the outboard side surface of the channel 34 is provided with a tapered cavity 44 to accommodate a tapered gib 46. The inboard surface of the channel 34 is provided with a tapered cavity 48 opposite the cavity 44 and a second longitudinally spaced tapered cavity 50.

Elongated tapered wedge gibs 52 and 54 are associated with the cavities or recesses 48 and 50 respectively. Now it can be seen that the gibs 46, 52 and 54 are each attached to the platen 10 for longitudinal adjustment in a manner which will be subsequently described in detail and which provides a bearing surface to transmit lateral or transverse loads imposed on a platen and to the sides of the main guideway 24. It can be seen that inasmuch as the lateral bearing loads are absorbed through the bearing surfaces presented by the gibs, that they also provide a wear surface and for this reason are preferably formed of a bronze bearing material. Preferably the guideways 24 and 26 are formed of a flame hardened steel so that wear caused by the reciprocating action of the slide device is taken up in the wedge gibs. The tapered configuration of the wedge gibs permit the gibs to be longitudinally adjusted so that wear on their bearing surfaces may be compensated at regular intervals. By providing a single wedge gib 46 on the outboard side of the guideway 24 and the pair of wedge gibs 52 and 54 on the inboard side of the guideways 24, the gibs and in particular the outboard gib 46 can be longitudinally adjusted such that the platen 10 can be slightly pivoted relative to the frame 12 in order to correct for any minor misalignment of the frame 12 relative to its mounting surface.

The preferred embodiment of the present invention is also provided with means for compensating for vertical displacement of the platen 10 caused by wear on the horizontal bearing surfaces between the guideways 24 and 26 and the channels 36 and 34. This means comprises elongated taper wedge wear gibs and which as can best be seen in FIG. 5 for purposes of illustration are associated with the keeper 40. The wear gibs 56 and 58 are disposed in a tapered recess provided in the keeper 40. A retainer plate 60 is fixed to each end of the keeper 40 by bolts 62. The head of an adjustment screw 64 is threadably connected to the large end of the gibs and has an enlarged head 66 which bears against the retainer 60. Thus wear of the horizontal surfaces is compensated for by adjusting the gibs 56 and 58 in a longitudinal direction to raise the surface 28 to maintain proper dimensional tolerances.

It is to be understood that the keeper 38 associated with the guideway 24 is also provided with a pair of wear compensating wedge gibs which bear on the under side of the overhanging edge of the machine way 24 in the same manner that the wear compensating gibs 56 and 58 bear on the underside of the overhanging edge of the auxiliary machine way 26. It is to be further understood that the gibs 46, 52 and 54 illustrated in FIG. 6 which compensate for wear caused by lateral forces are also adjustable for longitudinal disposition by a retainer plate and screw combination similar to the retainer plate 60 and adjusting screw 64 which are associated with the wear compensating gibs 56 and 58.

Now referring back to FIGS. 2 and 3, the end wall of frame 12 is provided with a longitudinal bore 68 and a second bore 70 axially aligned with the bore 68 and provided in an internal wall 72 to accommodate the cylinder 14 has an extensible rod 74 with a free end fixed to a bracket 76 carried on the underside of the platen 10. The free end of the rod 74 is connected to the bracket 76 by a countersunk threaded fastener 78. It can therefore be seen that as the rod 74 is extended and retracted from the cylinder 14, that it will produce movement of the platen 10 relative to the frame 12. Preferably the cylinder 14 is not provided with cushioning means for the rod 74 in its extreme extended position. This lack of cushioning in the extreme extended position is employed to maintain accuracy in the travel of the platen 10 as it moves into its extreme position. The bracket 76 carries a stop pad 80 which abuts a stop screw 82 threadably carried in the end wall of the frame 12. The stop screw is adjusted to accomodate the platen 10 and then is locked in place by a jam nut 84.

The blind end of the cylinder 14 is fixed to a manifold 86 adapted for connection through a flexible conduit 88 to a source of fluid pressure 90. The manifold 86 is secured to the frame 14 preferably by four threaded fasteners 92 only two of which are shown in FIG. 2. The manifold 86 is further provided with a hydraulic feed control panel 94 of any conventional type and is preferably actuated by a solenoid type spool valve connected to a source of electrical power through a plug 96. The output of the hydraulic feed control panel 94 is controlled by a lever 98 adapted to override a hand operated lever 100.

Now it is to be understood that the cylinder 14, manifold 86 and control feed panel 94 are joined together in a single unit for combination with and separation from the frame 12.

In operation, fluid under pressure is introduced from the source 90 to the manifold 86 where it is delivered through passages (not shown) to the feed control panel 94. The feed control panel 94 meters the amount of fluid delivered to the cylinder 14 so as to control the rate as the rod 74 extends or retracts. This rate is determined by the disposition of the lever 98. Normally the rod 74 will be advanced at three variable rates including a "rapid advance" rate when the rod commences its extension, a slower advance referred to as a "course speed" and then a still slower advance wherein the rod completes its stroke in what is referred to as a "fine feed." Normally the control panel 94 maintains the rod in this extended position for a dwell period before the control panel introduces fluid through the conduit 102 to retract the rod 74 and return the platen 10 to its rearward position. The manifold 86 is provided with suitable passages which discharge the exhausted flow from the cylinder 14 through a discharge conduit 104 to a fluid reservoir 106.

Figure 4:
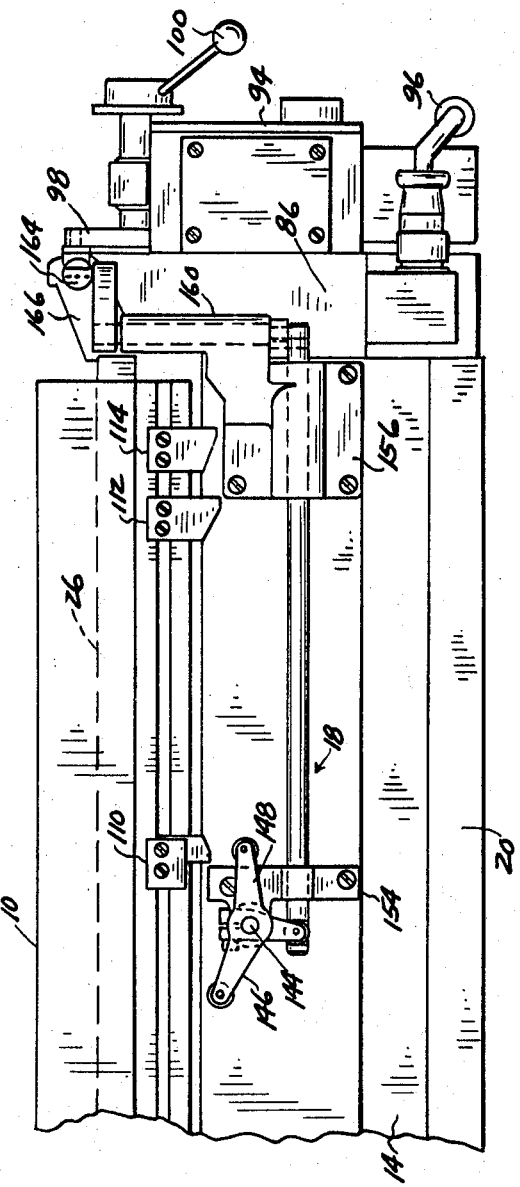
FIG. 4 is an enlarged elevational fragmentary view of the linkage system illustrated in FIG. 1 for transmitting a signal from the pivot member to the control unit.

The rotation of the lever 98 is controlled by a feed sensing apparatus 18 which is best illustrated in FIG. 4. The sensing apparatus 18 is movable in response to engagement with a plurality of selectively longitudinally spaced dogs 108, 110, 112 and 114 which are carried by the keeper 40. FIG. 10 illustrates a typical mounting for the dogs which includes a T nut 116 which is disposed in the T slot 42 and which is joined to dog 108 by a socket head set screw 118.

A mounting bracket 120 is affixed to the side surface of the frame 14 and under the keeper 40 to support limit switches 122, 124 and 126. The dogs 108, 110 and 112 each is associated with one of the limit switches 122, 124 and 126 respectively. A description of dog 108 and how it operatively engages switch 124 will serve to illustrate the fashion in which the other dogs engage the other limit switches. Now still referring to FIG. 10, switch 124 carries an extension sleeve 128. A cam roller 130 is carried on the free end of a lever 132 which is fixed to the sleeve 128. It is to be understood that the switch 124 is actuated by a pivotal movement of the lever 132 and is connected in electrical circuit closing relationship with the control apparatus 16. The dog 108 has a downward depending cammed section 134 which engages the lever 132 as platen 10 moves forwardly.

The dog 108 as hereinbefore described actuates the switch 122 and bypasses the switches 124 and 126. Switch 124 has a roller 136 which is spaced inwardly from the roller 130 and toward the bracket 120 as can best be seen in FIG. 10. Similarly switch 126 carries a roller 138 which is spaced inwardly of the rollers 136 and 130 by shortening the sleeve extension of the actuating pivot member of the switch 126. The dogs 110 and 112 are shortened so that downward depending cam sections 140 and 142 will engage the rollers 136 and 138 to thereby actuate the switches 124 and 126 in circuit closing relationship. It is to be understood of course that the switches 122 and 124 and 126 are all operatively connected to the control apparatus 16 for a purpose which will be subsequently described in detail.

Now referring back to FIG. 1, a lever 144 having divergent arms and including a forward arm 146 and rearward arm 148 is pivotally connected to the side of the frame 10 rearwardly of the bracket 120 and carries an actuating arm section 150 pivotally connected to an elongated rod 152. The rod 152 is supported for forward and rearward movement by brackets 154 and 156. Rod 152 extends through the bracket 156 and is pivotally connected to a lever 158. A lever shaft 160 is vertically supported for rotation in the bracket 156 and has one lower end operatively connected to the lever 158 and an upper end operatively connected to an upper lever 162. The outer end of the lever 162 is connected to a transversely disposed rod 164 which is supported in a pair of spaced apart supports 166 and 168 mounted on the top of the manifold 86.

Referring to FIG. 6, the rod 164 is provided with a cutout section 170 which operably engages the control lever 98 of the control feed panel 94.

Now it is to be understood that movement of the lever 144 produces a corresponding longitudinal movement of the rod 152 so that the rearward end of the rod 152 produces a rotation of the lever shaft 160 which in turn produces a transverse movement of the rod 164 to cause an actuating pivotal action of the control lever 98.

The normal cycle of operation of the preferred slide unit for purposes of description comprises five operative conditions. Starting with the position corresponding to the retracted position of the cylinder rod 74 wherein the platen 10 is in the rearward position, a signal from a remote station will actuate the control apparatus 16 to initiate the travel of the platen 10 in what is referred to as "rapid advance." As the platen 10 moves forward, the dog 110 engages the forward arm 146 of the pivot member 144 with a force sufficient to rotate the control lever 98 of the control apparatus 16 such that the cylinder rod 74 advances the platen 10 at a lesser rate of movement in what is referred to as "coarse speed."

The platen 10 continues to advance until the tool carried on the upper surface 28 approaches a workpiece at which time the dog 112 has advanced sufficiently that it engages the forward roller 146 of the pivot 144 to further rotate it such that the lever 98 of the control apparatus 16 is operatively moved to a position wherein the control apparatus admits a lesser rate of fluid to the cylinder 14 thus causing the platen 10 to be advanced at a still lesser rate of advance referred to as "fine feed."

Referring to FIG. 2 the stroke of the platen is terminated by the stop pad 80 abutting the inwardly directed end of the stop screw 82. As the platen 10 reaches its extreme forward position, the dog 108 engages the switch 122 which is operatively connected to the control apparatus 16 such that it commences to admit fluid through the conduit 102 of the cylinder 14 to retract the cylinder rod 74 thus returning the platen 10 to its rearward position in what is referred to as "rapid return."

The return travel of the platen 10 is terminated by the cam 112 engaging the rearward arm 148 of the pivot member 144 thus causing the lever 98 of the control apparatus 16 to be rotated to a "stop" position. The cylinder 14 is preferably of the type having a cushioned return stroke. When the movement of the platen has terminated in its rearward stroke, the dog 108 actuates the switch 126 which is connected to the control apparatus 16 in such a fashion as to start the cycle over again and to advance the platen 10 in the "rapid advance" phase.

It can thus be seen that the movement of the platen 10 can be adjusted to advance at variable rates of travel. Thus the movement of the platen 10 is controlled by dogs which actuate the control apparatus 16 through a sequence of mechanically transmitted and electrically transmitted signals. As can be seen in FIG. 4, the dogs 110, 112 and 114 are longitudinally movable relative to the platen 10 so that the timing at which the dogs engage the pivot member 144 and the switches can be varied according to the operation being performed by the tool carried by the platen 10. Additional steps can be incorporated in the cycle by adding other switches and modifying the circuit associated with the switches and the control apparatus 16 and by adding other dogs to the platen 10 at predetermined spaced intervals.

Because the slide apparatus normally is operated under conditions where substantial loads are imposed on the platen 10, it is necessary that a reliable supply of a lubricant be delivered between the sliding bearing surfaces. In the preferred embodiment of the present invention there are two separate lubrication systems, one associated with each of the guideways 24 and 26. Referring to FIGS. 1 and 2, a source of pressurized fluid lubricant (not shown) is delivered to the guideway 24 through the side of the frame 12 through a port 170 and on the opposite side of the frame 112 to the guideway 26 through the port 172. The basic concept of lubricating the guideways is similar for both the guideway 24 and the guideway 26, therefore a description of the lubrication system associated with the guideway 24 will be illustrative of the lubrication system for the auxiliary guideway 26.

Now referring to FIGS. 6, 7, 8 and 9, the fluid lubricant is delivered from the port 170 through a suitable passage provided in the frame 12 where it exits in a port 174 provided on the upper bearing surface of the guideway 24. Preferably the port 174 is provided intermediate the side edges of the machine way 24 and registers with an elongated groove 176 provided in the horizontal bearing surface of the channel 34 of the platen 10. The groove 176 has a length such that it registers with the port 174 from an extreme forward position to an extreme rearward position of the platen 10 relative to the guideway 24. The channel 34 further is provided with a series of circular grooves 178 which are arranged such that they either are connected directly with the elongated longitudinal groove 176 or indirectly connected to the groove 176 through a neighboring circular groove 178. Thus it can be seen that the elongated groove 176 and the circular grooves 178 cooperate to provide a lubricant film between the entire horizontal bearing surface between the platen 10 and the guideway 24.

Now as can best be seen in FIGS. 7 and 8 a short vertical passage 180 extends upwardly from the groove and terminates at a lateral internal passage 182. The outboard end of the passage 182 is closed by a plug 184. A vertical passage 186 is connected to the passage 182 and provides fluid communication to a short passage 188 to the outboard side of the channel 184. The channel 184 is provided with an angular groove 190 contoured such that it delivers the fluid lubricant to a longitudinal section of the bearing face of the channel 34. In a similar manner, a passage 192 is connected to the passage 182 and delivers fluid lubricant through a short passage 194 to the side wedge gib 54. The wedge gib 54 is provided with a groove 196 on its bearing face similar in configuration to the groove 190 on the opposite side of the channel 34.

In like manner the grooves 192 and 186 terminate at their lower ends with a suitable passage and grooving provided in the lower gibs 56 and 58.

The bearing surfaces of the auxiliary guideway 26 and the associated channel 36 of the platen 10 are provided with circular grooving 198 for lubricating the horizontal surface of the guideway 26. Connecting passages 200 and 202 fluidly connect with an elongated groove 204 registering with a port provided in the guideway 26 to deliver fluid to the lower gib carried by the platen and associated with the guideway 26. A wiper 206 is associated with opposite ends of the platen 10 and has a lower edge which engages the upper surface of the machine way. Preferably the wiper is formed of a suitable long wearing material such as leather.

Although I have described but one preferred embodiment of the present invention, it will be understood that many modifications and variations may be made therein without departing from the spirit of the invention.

I claim:
1. A slide apparatus comprising:
 (a) a first member having a guideway,
 (b) a second member having a channel therein, said channel being slidably mounted on said guideway to permit said second member to move in reciprocal relationship relative to said first member,
 (c) a fluid operator for reciprocating said second member relative to said first member, said fluid operator comprising,
  (1) a fluid cylinder having a rod extensible and retractable for travel in a direction corresponding to the relative movement of said first and second members; and
  (2) control apparatus connected with said fluid cylinder and adapted for connection to a source of pressurized fluid, said control apparatus responsive to a signal to introduce a quantity of fluid to said cylinder effective to move said rod at a selectively variable rate of travel;
 (d) means for connecting said fluid operator respectively to said first and to said second members,
 (e) means actuated by said second member moving past a selected position relative to said first member and operable to transmit a signal to said control apparatus, and
 (f) said guideway having a first pair of side surfaces, said channel having a second pair of side surfaces associated with said first pair of side surfaces, one of said pair of side surfaces having a plurality of wedge shaped recesses defined therein, said wedge shaped recesses facing the other of said pair of side surfaces, a tapered member disposed in each of said recesses, and means for adjusting the disposition of each of said tapered members so that said tapered members in combination are effective to transmit a lateral load imposed on said second member to said first member.

2. A slide apparatus as defined in claim 1, wherein said tapered members provide wear surfaces.

3. A slide apparatus as defined in claim 1, wherein said tapered members are individually adjustable to collectively align said second member relative to said first member in a direction transverse to the relative movement of said members.

4. A slide apparatus as defined in claim 1, wherein a single tapered member is disposed in a wedge shaped recess on a first side surface and a pair of tapered members are disposed in wedge shaped recesses on the side surface opposite to said first side surface, and said tapered members are adjustable to collectively align the channel of said second member relative to the guideway of said first member.

5. A slide apparatus as defined in claim 1, wherein said first member has a second guideway; said second member having a second channel defined therein and associated with said second guideway; and said guideway being effective to transmit a force on said second member in a direction normal to said guideways to said first member.

6. A slide apparatus as defined in claim 1, including means for positioning said second member toward and away from said first member.

7. A slide apparatus as defined in claim 1, wherein said second member is adapted for attachment in a third member.

8. A slide apparatus as defined in claim 1, wherein said control apparatus has a control lever, and said signaling means comprises a lever member having a pair of divergent arms and remotely supported from said control lever for pivotal movement relative to said first member; an actuating member carried by said second member for engaging one of said lever arms as said second member moves past a selected relative position of said second member and said first member, and means for transmitting the movement of the second of said lever arms to said control lever.

9. A slide apparatus as defined in claim 8, including a second actuating member carried by said second member and spaced from said first actuating member in a direction corresponding to the relative movement of said first and second members, and said second actuating member engageable with said lever member to produce a movement of said second lever arm of a magnitude different than the engagement of said first actuating member with said lever member.

10. A slide apparatus as defined in claim 9, wherein said control apparatus is operative in response to the engagement of said second actuating member with said lever member to move said rod at a rate different from the rate produced by the engagement of said first actuating member with said lever member.

11. A slide apparatus comprising:
(a) a first member having a guideway,
(b) a second member having a channel therein, said channel being slidably mounted on said guideway to permit said second member to move in reciprocal relationship relative to said first member,
(c) a fluid operator for reciprocating said second member relative to said first member, said fluid operator comprising,
  (1) a fluid cylinder having a rod extensible and retractable for travel in a direction corresponding to the relative movement of said first and second members; and
  (2) control apparatus connected with said fluid cylinder and adapted for connection to a source of pressurized fluid, said control apparatus responsive to a signal to introduce a quantity of fluid to said cylinder effective to move said rod at a selectively variable rate of travel;
(d) means for connecting said fluid operator respectively to said first and to said second members,
(e) means actuated by said second member moving past a selected position relative to said first member and operable to transmit a signal to said control apparatus, and
(f) said guideway having a first longitudinal bearing surface and a second longitudinal bearing surface, said channel having a first bearing surface associated with said first guideway bearing surface and a second bearing surface associated with said second guideway bearing surface, a port provided in said first guideway bearing surface, means delivering a fluid lubricant to said port, an elongated groove provided in said first channel bearing surface, said groove having a length corresponding to the movement of said second member relative to said first member so that said groove registers with said port in all relative positions of said member, a second port provided in said second channel bearing surface, and a passage communicating said groove with said second port.

12. A slide apparatus comprising:
(a) a first member having a guideway,
(b) a second member having a channel therein, said channel being slidably mounted on said guideway to permit said second member to move in reciprocal relationship relative to said first member,
(c) a fluid operator for reciprocating said second member relative to said first member, and separable from said first and second members as a unit, said fluid operator comprising,
  (1) a fluid cylinder having a rod extensible and retractable for travel in a direction corresponding to the relative movement of said first and second members; and
  (2) control apparatus forming an integral extension of said fluid cylinder and adapted for connection to a source of pressurized fluid, said control apparatus responsive to a signal to introduce a quantity of fluid to said cylinder effective to move said rod at a selectively variable rate of travel;
(d) means for removably connecting the free end of said rod to said second member,
(e) means for removably connecting said cylinder to said first member,
(f) means actuated by said second member moving past a selected position relative to said first member and operable to transfer the signal to said control apparatus, and
(g) said guideway having a first pair of side surfaces, said channel having a second pair of side surfaces associated with said first pair of side surfaces, one of said pair of side surfaces having at least one wedge shaped recess defined therein, said wedge shaped recess facing the other of said pair of side surfaces, a tapered member disposed in said recess, and means for longitudinally adjusting the disposition of said tapered member whereby said tapered member is operable to align said second member relative to said first member.

References Cited

UNITED STATES PATENTS

| | | | |
|---|---|---|---|
| 1,929,484 | 10/1933 | Davis | 91—426 |
| 2,860,487 | 11/1958 | Wheeler | 91—446 |
| 2,012,493 | 8/1935 | Barnes | 77—33.5 |
| 2,148,348 | 2/1939 | Groene | 173—19 |
| 2,172,595 | 9/1939 | Reid | 91—410 |
| 2,233,571 | 3/1941 | Alden | 77—33.5 |
| 2,324,727 | 7/1943 | Shartle | 91—27 |
| 2,588,937 | 3/1952 | Ringman | 92—165 |
| 3,060,466 | 10/1962 | Kozacka | 77—33.5 |
| 3,083,592 | 4/1963 | Carlstedt | 77—33.5 |
| 3,224,341 | 12/1965 | Bean | 91—407 |

MARTIN P. SCHWADRON, *Primary Examiner.*

IRVIN C. COHEN, *Assistant Examiner.*

U.S. Cl. X.R.

91—410; 308—5; 77—33.5; 173—19; 92—161